United States Patent
Dianda et al.

(10) Patent No.: US 7,929,940 B1
(45) Date of Patent: Apr. 19, 2011

(54) SYSTEM AND METHOD FOR TRANSMITTING WIRELESS DIGITAL SERVICE SIGNALS VIA POWER TRANSMISSION LINES

(75) Inventors: Janet Ruth Dianda, Herndon, VA (US); Sunil Prasad, Ashburn, VA (US)

(73) Assignee: Nextel Communications Inc., Reston, VA (US)

( * ) Notice: Subject to any disclaimer, the term of this patent is extended or adjusted under 35 U.S.C. 154(b) by 992 days.

(21) Appl. No.: 11/405,917

(22) Filed: Apr. 18, 2006

(51) Int. Cl.
H04M 9/00 (2006.01)

(52) U.S. Cl. ......... 455/402; 370/335; 340/500

(58) Field of Classification Search ......... 455/402; 370/335; 340/500
See application file for complete search history.

(56) References Cited

U.S. PATENT DOCUMENTS

| | | | |
|---|---|---|---|
| 5,682,256 | A | 10/1997 | Motley et al. |
| 5,832,364 | A | 11/1998 | Gustafson |
| 5,949,564 | A | 9/1999 | Wake |
| 6,243,571 | B1 | 6/2001 | Bullock et al. |
| 6,246,868 | B1 | 6/2001 | Bullock et al. |
| 6,525,855 | B1 | 2/2003 | Westbrook et al. |
| 6,628,633 | B1 * | 9/2003 | Mochizuki ............ 370/335 |
| 6,653,932 | B1 | 11/2003 | Beamish et al. |
| 6,778,817 | B1 | 8/2004 | Bullock et al. |
| 6,788,666 | B1 | 9/2004 | Linebarger et al. |
| 6,826,163 | B2 | 11/2004 | Mani et al. |
| 6,826,164 | B2 | 11/2004 | Mani et al. |
| 6,831,901 | B2 | 12/2004 | Millar |
| 6,963,552 | B2 | 11/2005 | Sabat et al. |
| 6,985,714 | B2 | 1/2006 | Akiyama et al. |
| 2001/0036163 | A1 | 11/2001 | Sabat et al. |
| 2002/0089951 | A1 | 7/2002 | Hyun et al. |
| 2002/0131387 | A1 | 9/2002 | Pitcher et al. |
| 2002/0186436 | A1 | 12/2002 | Mani et al. |
| 2002/0191565 | A1 | 12/2002 | Mani et al. |
| 2003/0016418 | A1 | 1/2003 | Westbrook et al. |
| 2004/0057393 | A1 | 3/2004 | Bianchi et al. |
| 2004/0198453 | A1 | 10/2004 | Cutrer et al. |
| 2004/0201469 | A1 * | 10/2004 | Bodin ............ 340/500 |
| 2004/0204097 | A1 | 10/2004 | Scheinert et al. |
| 2005/0147067 | A1 | 7/2005 | Mani et al. |
| 2005/0172198 | A1 | 8/2005 | Millar |
| 2005/0226625 | A1 | 10/2005 | Wake et al. |
| 2005/0243785 | A1 | 11/2005 | Sabat et al. |

OTHER PUBLICATIONS

U.S. Appl. No. 11/378,998, filed on Mar. 17, 2006, "Signal Conditioner and Method for Communicating over a Shared Transport Medium a Combined Digital Signal for Wireless Service". Inventors: Sunil Prasad and Janet Ruth Dianda.

U.S. Appl. No. 11/689,808, filed on Mar. 22, 2007, "Powerline Base Station", Inventors: Janet Ruth Dianda, Iyad Tarazi and Sunil Prasad.

* cited by examiner

Primary Examiner — Charles Shedrick

(57) ABSTRACT

A system and method of transmitting and receiving RF service signals between a base transceiver station (BTS) of a wireless communication system and subscriber units within a structure. In the forward link, the system demodulates the RF service signal from a BTS to recover a digital service signal; conditions the digital service signal for transmission via the powerline of a structure; and modulates an RF carrier with the digital service signal to generate the RF service signal for wireless transmission to subscriber units within the structure. In the reverse link, the system demodulates the RF service signal from subscriber unit(s) to generate a digital service signal; conditions the digital service signal for transmission via the powerline; and modulates an RF carrier with the digital service signal to generate the RF service signal for transmission to the BTS. Another embodiment eliminates the modulation of an RF carrier with the digital service signal to generate an RF service and vice-versa at the BTS.

12 Claims, 4 Drawing Sheets

SYSTEM AND METHOD FOR TRANSMITTING WIRELESS DIGITAL SERVICE SIGNALS VIA POWER TRANSMISSION LINES

FIELD OF THE INVENTION

This invention relates generally to wireless communication systems, and in particular, to a system and method for transmitting wireless digital service signals (DSS) by way of power transmission lines. The DSS includes digital information sent between base transceiver stations (BTS) and subscriber units (SU) via access control channels, common channels, traffic channels, and/or others. The invention further relates to a small electrical appliance, e.g., an antenna module, which serves as a wireless service signal antenna, with an optional repeater, which plugs into a standard wall outlet connected to the power line of a structure.

BACKGROUND OF THE INVENTION

Service providers of wireless communication systems are continuously working on improving the wireless coverage of their respective systems. They employ such techniques as providing more base transceiver stations (BTS) within a given area, providing BTS in areas not previously covered, and improving the performances of BTS and network equipment to reduce the probability of dropped calls and signal interference due to poor radio frequency (RF) environments.

Among these on-going developments is the improvement of wireless coverage inside buildings, dwellings, and other structures. Buildings generally have an adverse effect on the RF environment of a wireless communication system. They are constructed out of many RF affecting materials, such as grounded steel frames, that interfere with and/or reduce the signal strength of wireless communication signals inside of the building.

Attempts have been made at improving the wireless coverage inside buildings. One of these is to employ a repeater outside of a building and distributed antenna modules strategically placed inside of the building. In a BTS, the digital service signal (DSS) modulates an RF carrier, generating an analog RF signal (i.e., the RF service signal (RSS)), which is then sent through an antenna feed from the BTS to an antenna for propagation over the air. For a distributed antenna system (DAS), the RSS is sent over a physical medium to remote antennas, instead of being radiated over the air at the BTS.

For in-building coverage, in the forward link, the RSS is sent to distributed antenna modules via a dedicated physical medium, such as an optical fiber or coaxial cable, distributed within a building. The distributed antenna modules then transmits the RSS wirelessly to SUs (e.g., wireless communication devices, such as handsets) within the building. Similarly, in the reverse link, a distributed antenna module receives the RSS from one or more subscriber units, and sends it via the broadband physical medium for transmission back to the BTS.

There are several drawbacks with such a system. First, the transmission of the RSS within the building, as discussed above, typically requires a dedicated physical medium, such as optical fibers or coaxial cables. In current implementations, the RSS is sent over the physical medium as the analog RF signal received from the antenna feed. Alternatively, the RSS may be sampled, at a rate at least twice that of the bandwidth, according to the Nyquist theorem, to create a digitized representation of the analog RF signal, and then the RSS is sent to the DAS.

These methods require much greater bandwidth than the original DSS generated inside of a BTS. Since dedicated optical fibers or coaxial cables are required to provide enough bandwidth for the DAS, the medium is typically relatively expensive. Second, the labor associated with "wiring" the dedicated physical medium inside of a building is also typically relatively expensive. Third, if the analog RSS is sent across the physical medium, it is more susceptible to signal degradation due to noise, and/or inter-modulation products if two or more signals are transmitted.

SUMMARY OF THE INVENTION

An aspect of the invention relates to a system and method of transmitting the forward link digital service signal (DSS) produced by a base transceiver station (BTS) of a wireless communication system to subscriber units at a structure, such as a building, dwelling, tunnel, subway, etc. In each of the embodiments disclosed except for the fourth embodiment, the forward link DSS is recovered from the radio frequency (RF) service signal (RSS) (modulated by the original DSS in the BTS), by demodulating the RSS. In the fourth embodiment, the DSS is the signal emitted from the BTS (instead of the RSS).

The DSS is transmitted towards the subscriber units by way of the existing electrical power distribution line (i.e., powerline) of the structure. Since the signal transmitted is substantially identical to the original DSS generated within the BTS before modulation of an RF carrier, bandwidth requirements are greatly reduced, and there is no need for a dedicated physical medium, such as coaxial cables or optical fibers. Rather, the signal is routed via the existing powerline of the structure. Thus, the cost of implementing the system is relatively low since there is neither a need for the relatively expensive dedicated physical medium nor the relatively expensive labor associated with the "wiring" of the dedicated physical medium within the structure.

A small electrical appliance which serves as a wireless service signal antenna module, with an optional repeater, plugs into a standard wall outlet connected to the powerline of a structure. The small appliance contains a signal conditioner, which demodulates a reverse link RSS received from its antenna to generate a reverse link DSS, and transmits it toward the BTS. The small appliance also modulates an RF carrier with a forward link DSS received over the powerline to create a forward link RSS for transmission over its antenna. The DAS may be comprised of one or more electrical appliances plugged into wall outlets throughout a structure.

In a first embodiment, the system comprises a signal conditioner, connected to one or more BTS through one or more antenna feeds, adapted to recover the forward link DSS from the forward link RSS produced by the BTS by demodulating the RSS, and transmit the recovered DSS via a transport media bus to the structure. The system further includes a signal conditioner at the structure for conditioning the forward link DSS for transmission via the powerline of the structure; and one or more distributed antenna modules at the structure for modulating an RF carrier with the forward link DSS to produce the forward link RSS for wirelessly transmitting to subscribers units at the structure. Each distributed antenna module may be configured as a small electrical appliance which serves as a wireless service signal antenna, with an optional repeater, which plugs into a standard wall outlet connected to the powerline of the structure.

In a second embodiment, the system comprises a signal conditioner at the structure adapted to recover a forward link DSS from the forward link RSS wirelessly received from a BTS by demodulating the RSS, and transmit the recovered DSS via the powerline of the structure; and one or more distributed antenna modules at the structure for modulating an RF carrier with the forward link DSS to produce the forward link RSS for wirelessly transmitting to subscribers units at the structure. Each distributed antenna module may be configured as a small electrical appliance which serves as a wireless service signal antenna, with an optional repeater, which plugs into a standard wall outlet connected to the powerline of the structure.

In a third embodiment, the system comprises a signal conditioner at the structure adapted to recover a forward link DSS from the forward link RSS produced by a BTS located also at the structure by demodulating the RSS, and transmit the recovered DSS via the powerline of the structure; and one or more distributed antenna modules at the structure for modulating an RF carrier with the received DSS to produce the forward link RSS for wirelessly transmitting to subscribers units at the structure. Each distributed antenna module may be configured as a small electrical appliance which serves as a wireless service signal antenna, with an optional repeater, which plugs into a standard wall outlet connected to the powerline of the structure.

In a fourth embodiment, the system comprises a signal conditioner connected to a BTS, wherein the signal conditioner is adapted to receive the forward link DSS directly from the BTS, and condition the forward link DSS for transmission via a transport media bus. The system further includes a signal conditioner at the structure for conditioning the received forward link DSS for transmission via the powerline of the structure; and one or more distributed antenna modules at the structure for modulating an RF carrier with the received forward link DSS to produce the forward link RSS for wirelessly transmitting to subscribers units at the structure. Each distributed antenna module may be configured as a small electrical appliance which serves as a wireless service signal antenna, with an optional repeater, which plugs into a standard wall outlet connected to the powerline of the structure.

Another aspect of the invention relates to a system and method of transmitting the reverse link, radio frequency (RF) signal produced by a subscriber unit at a structure to a base transceiver station (BTS) of a wireless communication system. In each of the embodiments disclosed, a corresponding reverse link digital service signal (DSS) is generated from the radio frequency (RF) signal, and transmitted towards the BTS by way of the existing electrical power distribution line (i.e., powerline) of the structure. As discussed above, there are several advantages for demodulating the analog RF signal to produce the DSS, and transmitting the DSS via the powerline of the structure, instead of transmitting the analog RF signal or digitized signal produced by sampling the analog RF signal.

In a first embodiment, the system comprises one or more distributed antenna modules at the structure for wirelessly receiving the reverse link RF service signal (RSS) from one or more subscriber units, and demodulating it to produce a reverse link digital service signal (DSS) for transmission via the powerline of the structure. Each distributed antenna module may be configured as a small electrical appliance which serves as a wireless service signal antenna, with an optional repeater, which plugs into a standard wall outlet connected to the powerline of the structure. The system further includes a signal conditioner at the structure for conditioning the reverse link DSS received from the powerline for transmission via a transport media bus towards a BTS; and a signal conditioner at the BTS for modulating an RF carrier with the reverse link DSS received from the transport media bus to produce the reverse link RSS for transmission to the BTS.

In a second embodiment, the system comprises one or more distributed antenna modules at the structure for wirelessly receiving the reverse link RSS from one or more subscriber units, and demodulating it to produce a reverse link DSS for transmission via the powerline of the structure. Each distributed antenna module may be configured as a small electrical appliance which serves as a wireless service signal antenna, with an optional repeater, which plugs into a standard wall outlet connected to the powerline of the structure. The system further includes a signal conditioner at the structure for modulating an RF carrier with the reverse link DSS received from the powerline to produce the reverse link RSS for transmission to the BTS via a wireless medium.

In a third embodiment, the system comprises one or more distributed antenna modules at the structure for wirelessly receiving the reverse link RSS from one or more subscriber units, and demodulating it to produce a reverse link DSS for transmission via the powerline of the structure. Each distributed antenna module may be configured as a small electrical appliance which serves as a wireless service signal antenna, with an optional repeater, which plugs into a standard wall outlet connected to the powerline of the structure. The system further includes a signal conditioner at the structure for modulating an RF carrier with the reverse link DSS received from the powerline to produce the reverse link RSS for transmission to a BTS located also at the structure.

In a fourth embodiment, the system comprises one or more distributed antenna modules at the structure for wirelessly receiving the reverse link RSS from one or more subscriber units, and demodulating it to produce a reverse link DSS for transmission via the powerline of the structure. Each distributed antenna module may be configured as a small electrical appliance which serves as a wireless service signal antenna, with an optional repeater, which plugs into a standard wall outlet connected to the powerline of the structure. The system further includes a signal conditioner at the structure for conditioning the reverse link DSS received from the powerline for transmission via a transport media bus towards the BTS; and a signal conditioner connected to the BTS for extracting the reverse link DSS from the transport media bus for transmission to the BTS.

Other aspects, advantages and novel features of the present invention will become apparent from the following detailed description of the invention when considered in conjunction with the accompanying drawings.

DETAILED DESCRIPTION OF THE EXEMPLARY EMBODIMENTS

Figure 1:
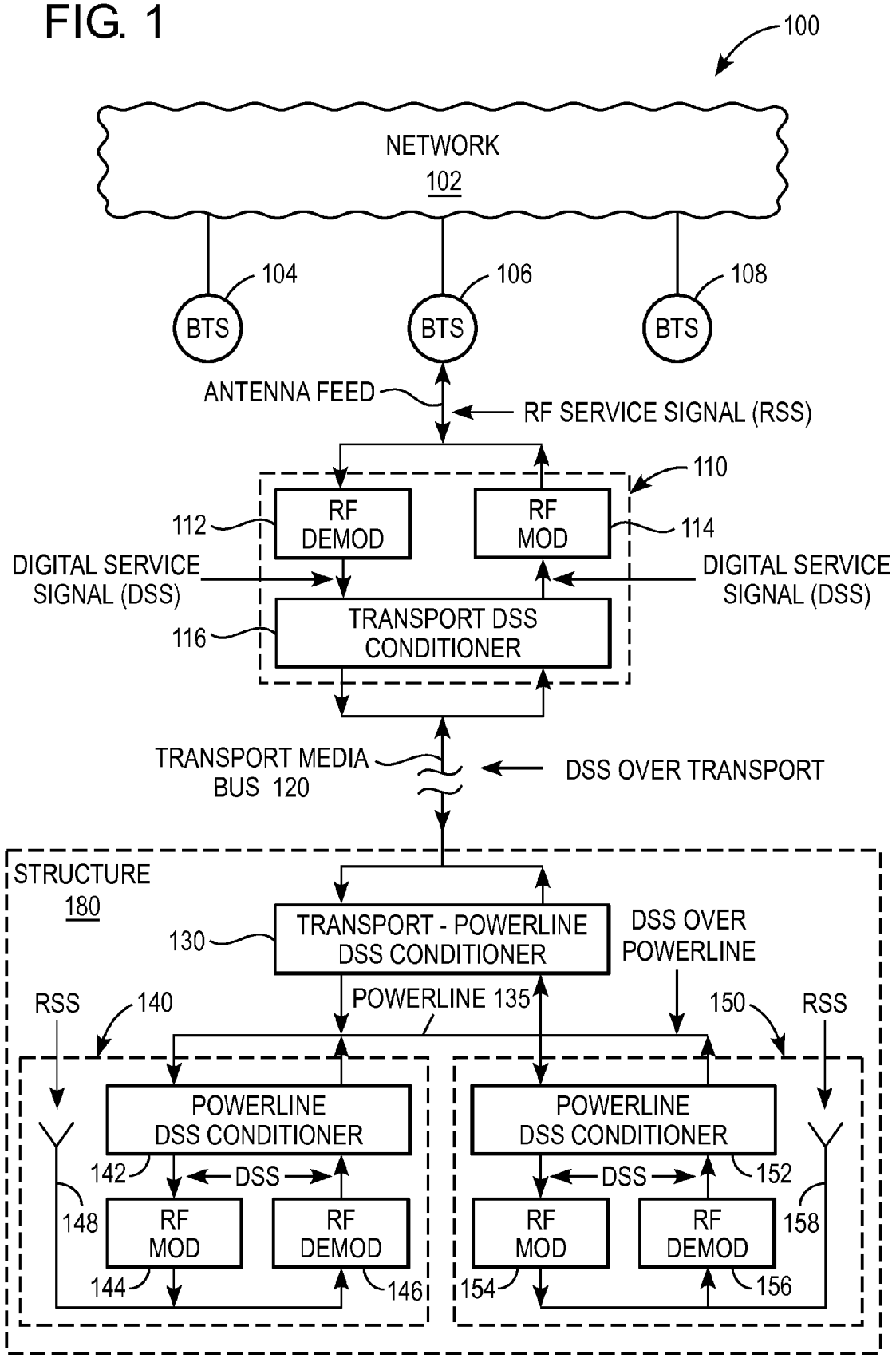
FIG. 1 illustrates a block diagram of an exemplary communication system in accordance with an embodiment of the invention.

FIG. 1 illustrates a block diagram of an exemplary communication system 100 in accordance with an embodiment of the invention. The communication system 100 is particularly suited for improving the wireless coverage inside a structure 180, such as a building, dwelling, residence, tunnel, subway, or other structure defining an interior region for improved wireless coverage. The communication system 100 can be broken down into three subsystems, a network-side subsystem, a structure-side subsystem, and a communication medium connecting the network-side subsystem to the structure-side subsystem.

More specifically, on the network-side, the communication system 100 comprises a network 102, a plurality of base transceiver stations (BTS) 104, 106, and 108 coupled to the network 102, and a signal conditioner 110 connected to the BTS 106. It shall be understood that other similar signal conditioners may be connected to BTS 104 and 108, respectively. Also, one or more BTS may be connected to signal conditioner 110.

The network 102 includes a plurality of network devices configured to provide the specified wireless services for subscribers. For example, the specified wireless services may include interconnect (cellular) communication services, dispatch communication services, data communication services, and other wireless communication services. The network 102 may be based on any number of technologies and/or protocols. For example, the network 102 may be based on internet protocol (IP), Ethernet in accordance with the Institute of Electrical and Electronic Engineers (IEEE) 802.3 standards, Synchronous Optical NETwork (SONET), asynchronous transfer mode (ATM), frame relay, WiMAX or others including proprietary technologies and/or protocols.

The BTS 104, 106, and 108 serve as a signal interface between the wireless environment in which subscriber units reside, and the wired or wireless environment of the network 102. The BTS 104, 106, and 108 may generate and receive RF service signals (RSS) in accordance with any of a number of technologies and/or protocols, including Code Division Multiple Access (CDMA), Time Division Multiple Access (TDMA), Orthogonal Frequency Division Multiple Access (OFDMA), and others.

The signal conditioner 110 recovers the forward link digital service signal (DSS) from the forward link RF service signal (RSS) received from the antenna feed of the BTS 106 by demodulating the RSS, and also transmits the recovered forward link DSS to the structure 180 via a transport media bus 120. The signal conditioner 110 also modulates a radio frequency (RF) carrier with the reverse link DSS received from the structure 180 via the transport media bus 120 to produce an analog RF signal (i.e., the reverse link RSS) for transmission to the BTS 106 via its antenna feed.

The forward link DSS is the digital signal generated internally in the BTS 106 prior to it modulating an RF carrier for transmission. The forward link DSS includes the digital information sent via the access control channels, common channels, traffic channels, and/or other digital information sent to subscriber units. The reverse link DSS is the digital signal generated internally by a signal conditioner by demodulating an RSS which it receives over the air through an antenna. The reverse link DSS is comprised of a summation of one or more reverse link DSS generated internally by one or more subscriber units prior to each one modulating an RF carrier with its reverse link DSS for transmission via the wireless medium by radiating the RSS through a subscriber unit's antenna. The reverse link DSS includes the digital information sent via the access control channels, common channels, traffic channels, and/or other digital information sent toward a BTS.

In particular, the signal conditioner 110 comprises an RF demodulator 112, an RF modulator 114, and a transport DSS conditioner 116. The RF demodulator 112 demodulates the forward link RSS it receives from the BTS 106 via its antenna feed to produce the forward link DSS. In the forward link, the transport DSS conditioner 116 conditions the DSS it receives from the RF demodulator 112 for transmission via the transport media bus 120 (DSS over transport). In the reverse link, the transport DSS conditioner 116 extracts the DSS from the transport media bus 120. The RF modulator 114 modulates an RF carrier with the reverse link DSS it receives from the transport DSS conditioner 116 to generate the reverse link RSS and provides it to the BTS 106 via its antenna feed.

The transport media bus 120 may be any medium for transmitting the DSS between the signal conditioner 110 and the structure-side system. The transport media bus 120 may include wired physical medium, such as coaxial cable, optical fiber, twisted pair of copper wires, or electrical power lines. The transport media bus 120 may include any broadband technology or protocol, such as IEEE 1901, HomePlug, or other standard or proprietary Power Line Communication protocol, International Telecommunication Union-Telecommunications (ITU-T) recommendation G.993.2 Very high-bit-rate Digital Subscriber line, 2nd Generation (VDSL2), Ethernet in accordance with the Institute of Electrical and Electronic Engineers (IEEE) 802.3 standards, Synchronous Optical NETwork (SONET), and others. The transport media bus 120 may also include radio frequency (RF) over wireless medium, such as millimeter wave radio, Broadband Radio Spectrum, Free Space Optics, microwave radio, and others.

On the structure side, the communication system 100 comprises a transport-powerline DSS conditioner 130 connected to the transport media bus 120, and a plurality of distributed antenna modules 140 and 150 in communication with the transport-powerline DSS conditioner 130 via the electrical powerline 135 of the structure 180. Each distributed antenna module (140 and 150) includes a powerline DSS conditioner (142 and 152), an RF modulator (144 and 154), an RF demodulator (146 and 156), and an antenna (148 and 158). Although, in this example, two distributed antenna modules 140 and 150 are shown, it shall be understood that there may be any number of distributed antenna modules situated within the structure 180 to provide adequate wireless coverage.

Each distributed antenna module (140 and 150) may be configured as a small electrical appliance which serves as a wireless service signal antenna, with an optional repeater, and plugs into a standard wall outlet connected to the powerline 135 of the structure 180. As discussed in more detail below, the small electrical appliance contains a signal conditioner, which demodulates a reverse link RSS received from its antenna to generate a reverse link DSS and transmits it toward the BTS, and which modulates an RF carrier with a forward link DSS received over the powerline 135 of the structure 180 to create a forward link RSS for transmission over its antenna.

In the forward link, the transport-powerline DSS conditioner 130 extracts the DSS from the transport media bus 120, and conditions the digital service signal (DSS) for transmission via the powerline 135 of the structure 180. In the reverse link, the transport-powerline DSS conditioner 130 extracts the digital service signal (DSS) from the powerline 135, and conditions the digital service signal (DSS) for transmission via the transport media bus 120. The digital service signal (DSS) may be placed on the powerline 135 using many different techniques and/or protocols, such as Broadband over Powerline, HomePlug, or IEEE 1901.

In the forward link, the powerline DSS conditioner (142 and 152) of the distributed antenna modules (140 and 150) extracts the digital service signal (DSS) from the powerline 135. The RF modulator (144 and 154) of the distributed antenna modules (140 and 150) modulates an RF carrier with the DSS received from the powerline DSS conditioner (142 and 152) to form the RSS, and sends it to the antenna (148 and 158) for transmission via the wireless medium within the structure 180. In the reverse link, the RF demodulator (146 and 156) receives the reverse link RSS from subscriber units via the antenna (148 and 158) and demodulates the RSS to generate the DSS. The powerline DSS conditioner (142 and 152) conditions the DSS it receives from the RF demodulator (146 and 156) for transmission via the powerline 135.

In summary, in the forward link, the RSS generated by the BTS 106 by modulating an RF carrier with the original DSS, is sent to subscriber units residing within the structure 180 by way of the signal conditioner 110, transport media bus 120, transport-powerline DSS conditioner 130, powerline 135, and the distributed antenna modules 140 and 150. Along the way, the RSS is demodulated to recover the DSS and conditioned for transmission via the transport media bus 120 by the signal conditioner 110; then the DSS is conditioned for transmission via the powerline 135 by the transport-powerline DSS conditioner 130; and then an RF carrier is modulated by the DSS to generate an RSS, which is radiated as an RSS by the distributed antenna modules 140 and 150 for reception by the subscriber units within the structure 180.

In the reverse link, the RSS generated by subscriber units within the structure 180 is sent to the BTS 106 by way of the corresponding distributed antenna module (140 and 150), the powerline 135, the transport-powerline DSS conditioner 130, transport media bus 120, and signal conditioner 110. Along the way, the RSS is demodulated to generate the DSS for transmission via the powerline 135 by the corresponding distributed antenna module (140 and 150); then the DSS is conditioned for transmission via the transport media bus 120 by the transport-powerline DSS conditioner 130; and then an RF carrier is modulated with the DSS by the signal conditioner 110 to generate the RSS for transmission to the BTS 106 over an antenna feed.

The communication system 100 has several advantages over prior attempts of providing improved in-building wireless coverage. First, because the transmission via the powerline 135 of the structure 180 is the recovered DSS, the bandwidth requirement is much less than that for RF analog transmission, or alternatively, much less than that for a digitized RF signal that is created by sampling the RSS, at a rate at least twice that of the bandwidth, according to the Nyquist theorem, to create a digitized representation of the analog RF signal. Consequently, the existing low voltage powerline of the structure 180 can be used. Second, because the DSS is transmitted using the existing powerline 135 of the structure 180, there is no need to incur costs associated with obtaining a dedicated physical medium and the labor to route it within the structure 180. Third, because the transmission via the powerline is in digital format, it is less susceptible to signal degradation due to noise and/or inter-modulation products than an analog RSS. The following exemplary embodiments provide several variations of communication system 100.

Figure 2:
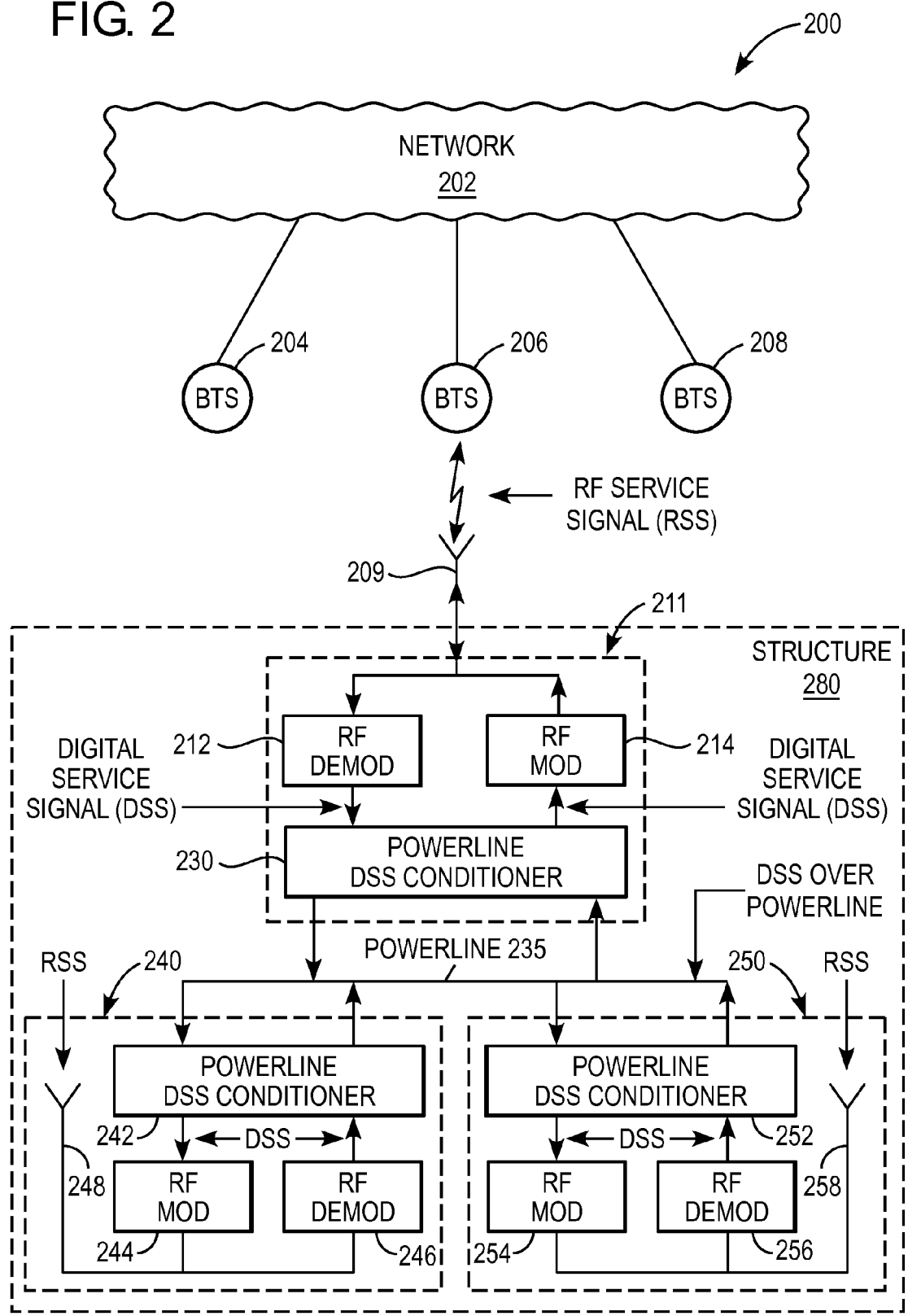
FIG. 2 illustrates a block diagram of another exemplary communication system in accordance with another embodiment of the invention.

FIG. 2 illustrates a block diagram of another exemplary communication system 200 in accordance with another embodiment of the invention. The communication system 200 is a variation of communication system 100. Elements common to both systems 100 and 200 have the same reference numbers, except the most significant digit is a "2" for system 200 and a "1" for system 100. The detailed discussion of these common elements has been provided above with reference to communication system 100.

In communication system 200, the RSS is transmitted to and received from the structure over the wireless medium in accordance with the normal operation of a typical BTS; the demodulation of the RSS to recover the DSS, and vice versa, is performed by a modified signal conditioner 211 residing in the structure 280; and the modified signal conditioner 211 conditions the DSS for transmission via the powerline 235 of the structure 280 (instead of the transport media bus), and extracts the DSS directly from the powerline 235 (instead of the transport media bus). Accordingly, in communication system 200, there is no need for a transport media bus.

In the forward link, the RSS generated by the BTS 106 is sent over the wireless medium, and picked up by an antenna 209 at the structure 280. The modified signal conditioner 211 demodulates the received RSS to recover the DSS for transmission via the powerline 235. The distributed antenna modules 240 and 250 modulate an RF carrier with the DSS received via the powerline 235 to generate the RSS for transmission to the subscriber units within the structure 280.

In the reverse link, the distributed antenna module (240 and/or 250) receives the RSS generated by one or more subscriber units within the structure 280, and demodulates it to generate the DSS for transmission via the powerline 235. The modified signal conditioner 211 receives the DSS from the powerline 235, and modulates an RF carrier to generate the RSS for wireless transmission to the BTS 206 by way of the antenna 209.

Figure 3:
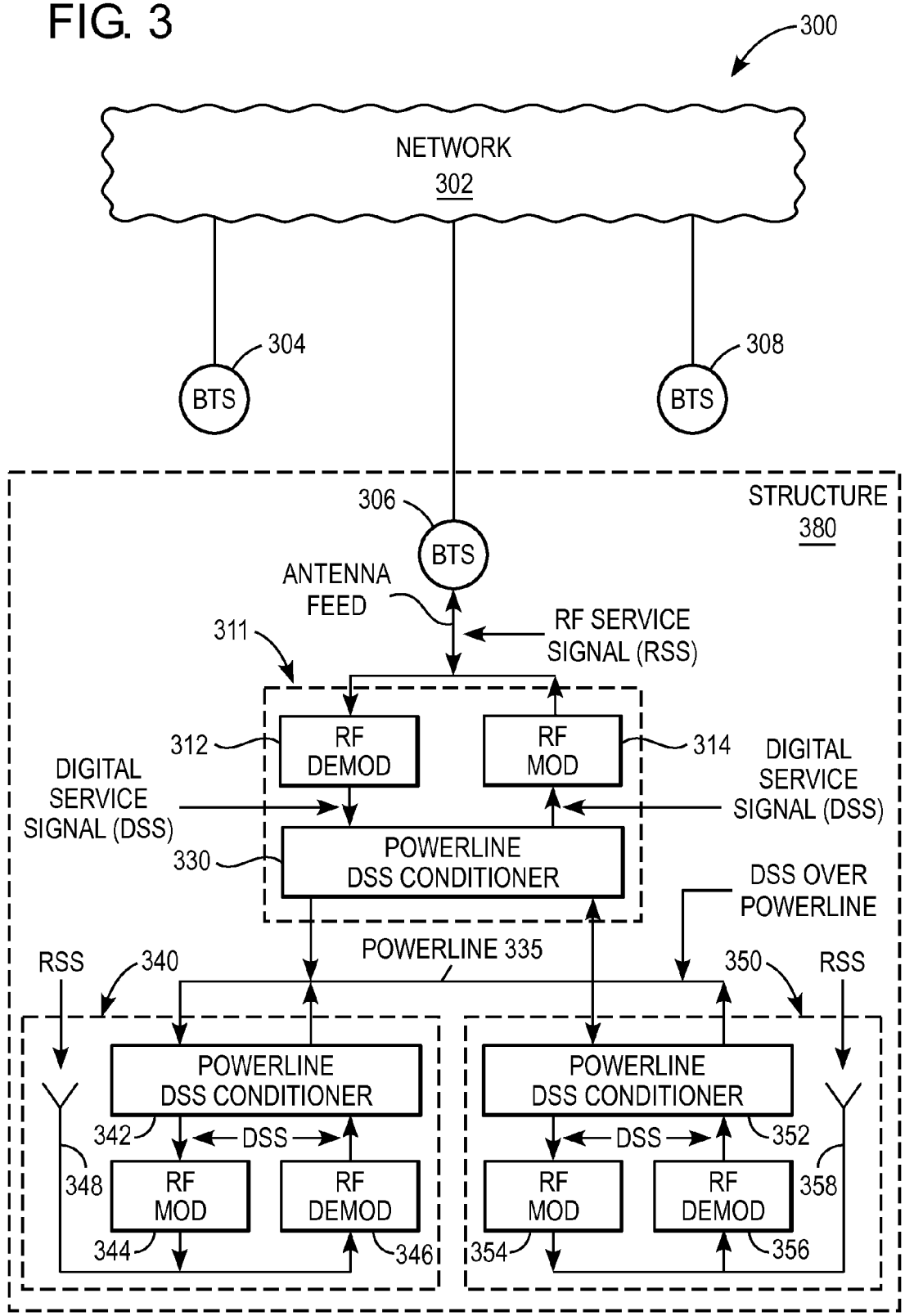
FIG. 3 illustrates a block diagram of another exemplary communication system in accordance with another embodiment of the invention.

FIG. 3 illustrates a block diagram of another exemplary communication system 300 in accordance with another embodiment of the invention. The communication system 300 is a variation of communication system 200. Elements common to both systems 300 and 200 have the same reference numbers, except the most significant digit is a "3" for system 300, and a "2" for system 200. The detailed discussion of these common elements has been provided above.

In communication system 300, the BTS 306 is located at the structure 380. Accordingly, the signal conditioner 311 receives the forward link RSS via the antenna feed of the BTS 306 instead of over the air as in system 200. Everything else is substantially the same as in communication system 200.

Accordingly, in the forward link, the RSS generated by the BTS 306 is sent to the signal conditioner 311 via the antenna feed of the BTS 306. The signal conditioner 311 demodulates the received RSS to recover the DSS for transmission via the powerline 335. The distributed antenna modules 340 and 350 modulate an RF carrier with the DSS received via the powerline 335 to generate the RSS for transmission to the subscriber units within the structure 380.

In the reverse link, the distributed antenna module (340 and/or 350) receives the RSS generated by one or more subscriber units within the structure 380, demodulates it to generate the DSS, and conditions the DSS for transmission via the powerline 335. The signal conditioner 311 receives the DSS from the powerline 335, and modulates an RF carrier with the DSS to generate the RSS for transmission to the BTS 306 by way of its antenna feed.

Figure 4:
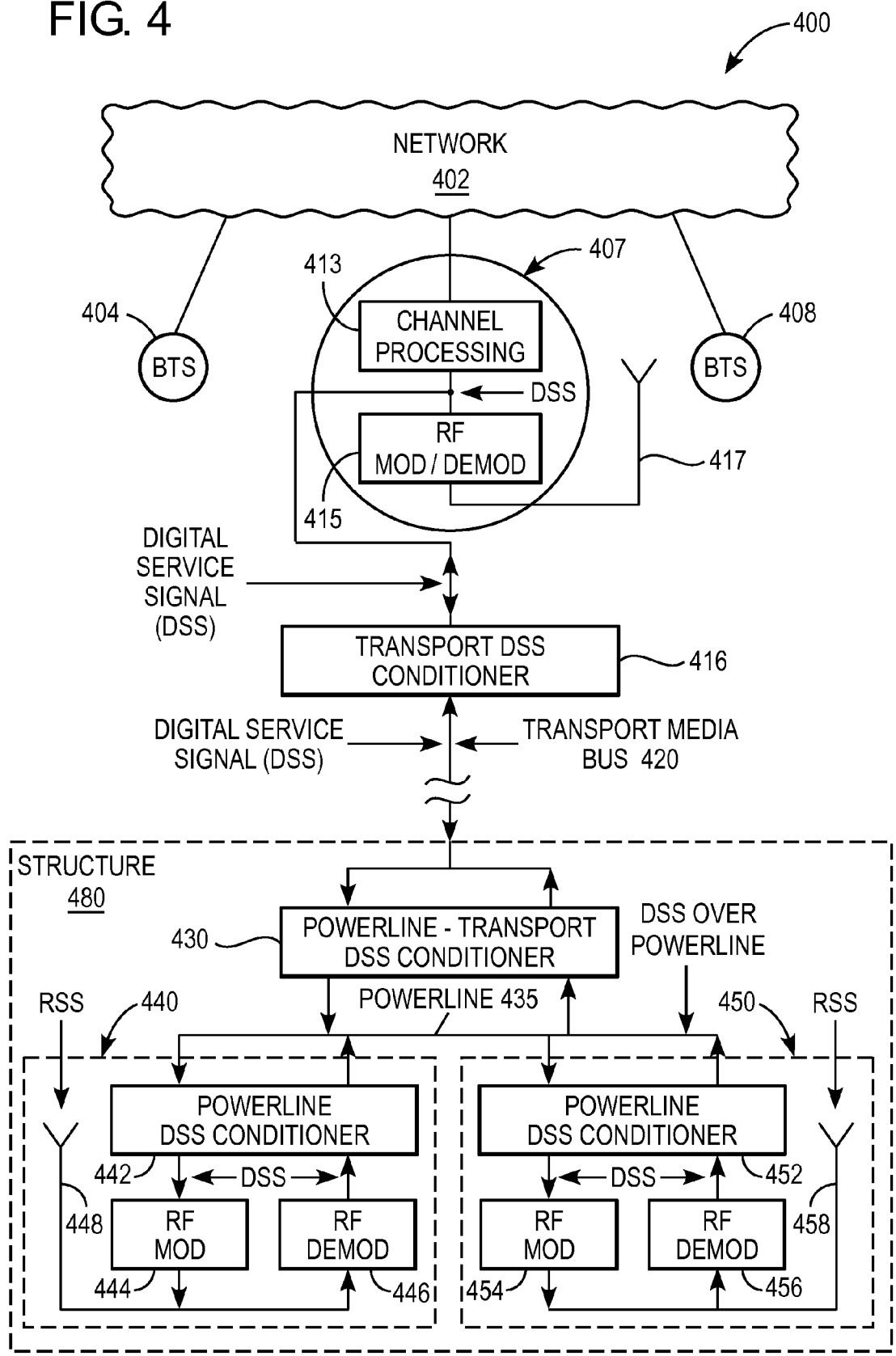
FIG. 4 illustrates a block diagram of another exemplary communication system in accordance with another embodiment of the invention.

FIG. 4 illustrates a block diagram of another exemplary communication system 400 in accordance with another embodiment of the invention. The communication system 400 is a variation of communication system 100. Elements common to both systems 400 and 100 have the same reference numbers, except the most significant digit is a "4" for system 400, and a "1" for system 100. The detailed discussion of these common elements has been provided above.

In communication system 400, the BTS 407 is modified to directly produce and receive the DSS, e.g., an open BTS designed to communicate with a remote Radio Frequency head. Due to this, there is no need for the RF modulator and demodulator of the signal conditioner 110 of communication system 100. Instead, the communication system 400 incorporates the transport DSS conditioner 416 to condition the DSS it receives directly from the BTS 407 for transmission via the transport media bus 420 in the forward link, and extracts the DSS from the transport media bus 420 and sends it directly to the BTS 407 in the reverse link. Everything else is substantially the same as in communication system 100.

Accordingly, in the forward link, the transport DSS conditioner 416 conditions the DSS it has received directly from the BTS 407 for transmission via the transport media bus 420. The powerline-transport DSS conditioner 430 conditions the DSS it has received by way of the transport media bus 420 for transmission via the structure powerline 435. The distributed antenna modules 440 and 450 each modulates an RF carrier with the DSS received via the powerline 435 to generate the RSS for transmission to the subscriber units within the structure 480.

In the reverse link, the distributed antenna module (440 and/or 450) receives the RSS generated by one or more subscriber units within the structure 480, and demodulates it to generate the DSS for transmission via the powerline 435. The transport-powerline DSS conditioner 430 conditions the DSS it receives via the powerline 435 for transmission via the transport media bus 420. The transport DSS conditioner 416 extracts the DSS from the transport media bus 420, and provides it directly to the BTS 407.

The distributed antenna modules and the various conditioners, may have a relatively small form factor, comparable to a night light or plug-in air freshener. They may be configured to plug directly into a standard electrical outlet, conforming to a standard or protocol for PowerLine Communications, such as HomePlug or IEEE 1901 or others. The distributed antenna module may contain a signal conditioner within the same small electrical appliance. In other words, the distributed antenna modules may be designed to blend into a household.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A system, comprising:
    a structure-side subsystem; and
    a network-side subsystem connected to the structure-side subsystem via a transport media bus that is one of a coaxial cable, optical fiber or twisted pair of copper wires,
    wherein the structure-side subsystem includes
        a first signal conditioner adapted to condition a forward link digital service signal (DSS) of a wireless communication system for transmission via a powerline of a structure, wherein said first signal conditioner is further adapted to extract said forward link digital service signal (DSS) from the transport media bus; and
        an antenna module, directly connected to the first signal conditioner via the powerline, adapted to modulate an RF carrier with said forward link digital service signal (DSS) to generate a forward link radio frequency (RF) service signal (RSS) for transmission via a wireless medium at said structure; and
    wherein the network-side subsystem includes a second signal conditioner adapted to condition said forward link digital service signal (DSS) for transmission to said first signal conditioner by way of said transport media bus, wherein said second signal conditioner is adapted to directly receive said forward link digital service signal (DSS) from a base transceiver station (BTS) of said wireless communication system via a hard-wired antenna feed.

2. The system of claim 1, wherein said first signal conditioner is adapted to condition said forward link digital service signal (DSS) for transmission via said powerline in accordance with a powerline communication protocol.

3. The system of claim 1, wherein said second signal conditioner further comprises an RF demodulator adapted to generate said forward link digital service signal (DSS) by demodulating said RF service signal (RSS) received from the base transceiver station (BTS) of said wireless communication system.

4. The system of claim 1, wherein the second signal conditioner comprises a signal conditioner which comprises an RF demodulator adapted to generate said forward link digital service signal (DSS) by demodulating said forward link RF service signal (RSS) received from the base transceiver station (BTS) of said wireless communication system.

5. The system of claim 1, wherein said antenna module comprises:
    a powerline signal conditioner adapted to extract said forward link digital service signal (DSS) from said powerline;
    an RF modulator adapted to generate said forward link RF service signal (RSS) by modulating said RF carrier with said forward link digital service signal (DSS) received from said powerline; and
    an antenna adapted to wirelessly transmit said forward link RF service signal (RSS).

6. A method of transmitting a forward link radio frequency (RF) service signal (RSS) of a base transceiver station (BTS) of a wireless communication system to one or more subscriber units at a structure, comprising:
    transmitting, by a signal conditioner of a network-side subsystem, a forward link digital service signal (DSS) to a powerline by way of a transport media bus, wherein said forward link digital service signal (DSS) is directly received by the signal conditioner of the network-side subsystem from a base transceiver station (BTS) of said wireless communication system via a hard-wired antenna feed;
    receiving, by a signal conditioner of a structure-side subsystem, said forward link digital service signal (DSS) via the transport media bus that is one of a coaxial cable, optical fiber or twisted pair of copper wires;
    transmitting, by the signal conditioner of a structure-side subsystem, said forward link digital service signal (DSS) via a powerline of said structure, wherein said forward link digital service signal (DSS) is extracted from said transport media bus;
    receiving, by an antenna module of the structure-side subsystem, said forward link digital service signal (DSS) directly from the signal conditioner of the structure-side subsystem via the powerline;
    modulating, by the antenna module of the structure-side subsystem, an RF carrier with said forward link digital service signal (DSS) received from said powerline to generate said forward link RF service signal (RSS); and
    wirelessly transmitting, by the antenna module of the structure-side subsystem, said RF service signal (RSS) to said one or more subscriber units.

7. The method of claim 6, further comprising demodulating said forward link RF service signal (RSS) received from said base transceiver station (BTS) to generate said forward link digital service signal (DSS).

8. A system, comprising:
- a structure-side subsystem; and
- a network-side subsystem connected to the structure-side subsystem via a transport media bus that is one of a coaxial cable, optical fiber or twisted pair of copper wires,
- wherein the structure-side subsystem includes
  - an antenna module adapted to demodulate a reverse link RF service signal (RSS) wirelessly received from one or more subscriber units at a structure to generate a reverse link digital service signal (DSS) for transmission via a powerline of said structure; and
  - a first signal conditioner adapted to receive said reverse link digital service signal (DSS) via a direct powerline connection and to extract said reverse link digital service signal (DSS) from said powerline for transmission towards a base transceiver station (BTS) of a wireless communication system, wherein said first signal conditioner is further adapted to condition said reverse link digital service signal (DSS) for transmission via the transport media bus; and
- wherein the network-side subsystem that includes a second signal conditioner adapted to extract said reverse link digital service signal (DSS) from said transport media bus and directly provide said reverse link digital service signal (DSS) to a base transceiver station (BTS) of said wireless communication system via a hard-wired antenna feed.

9. The system of claim 8, wherein the second signal conditioner comprises a signal conditioner comprising an RF modulator adapted to generate a reverse link RF service signal (RSS) for a base transceiver station (BTS) by modulating an RF carrier with said digital service signal (DSS) received from said first signal conditioner, wherein said second signal conditioner is adapted to send said reverse link digital service signal (DSS) to the base transceiver station (BTS) of said wireless communication system.

10. The system of claim 9, wherein said antenna module comprises:
- an antenna adapted to wirelessly receive said reverse link RF service signal (RSS) from said subscriber unit;
- an RF demodulator adapted to generate said reverse link digital service signal (DSS) by demodulating said reverse link RF service signal (RSS); and
- a powerline signal conditioner adapted to condition said reverse link digital service signal (DSS) for transmission via said powerline to said first signal conditioner.

11. A method of transmitting a reverse link radio frequency (RF) service signal (RSS) of one or more subscriber units at a structure to a base transceiver station (BTS) of a wireless communication system, comprising:
- wirelessly receiving, by an antenna module of a structure-side subsystem, said reverse link RF service signal (RSS) from said one or more subscriber units;
- demodulating, by the antenna module of the structure-side subsystem, said reverse link RF service signal (RSS) to generate a reverse link digital service signal (DSS);
- transmitting, by the antenna module of the structure-side subsystem, said reverse link digital service signal (DSS) towards said base transceiver station (BTS) via direct connection of a powerline of said structure to a signal conditioner of the structure-side subsystem;
- transmitting, by the signal conditioner of the structure-side subsystem, said reverse link digital service signal (DSS) received from said powerline towards said base transceiver station (BTS) by way of a transport media bus that is one of a coaxial cable, optical fiber or twisted pair of copper wires; and
- directly providing, by a signal conditioner of a network-side subsystem, said reverse link digital service signal (DSS) to a base transceiver station (BTS) of said wireless communication system via a hard-wired antenna feed.

12. The method of claim 11, further comprising modulating an RF carrier with said reverse link digital service signal (DSS) to generate a reverse link RF service signal (RSS) for the base transceiver station (BTS) and sending said reverse link RF service signal (RSS) to said base transceiver station.

\* \* \* \* \*